A. W. CASH.
TAPPING MACHINE.
APPLICATION FILED JUNE 23, 1915.

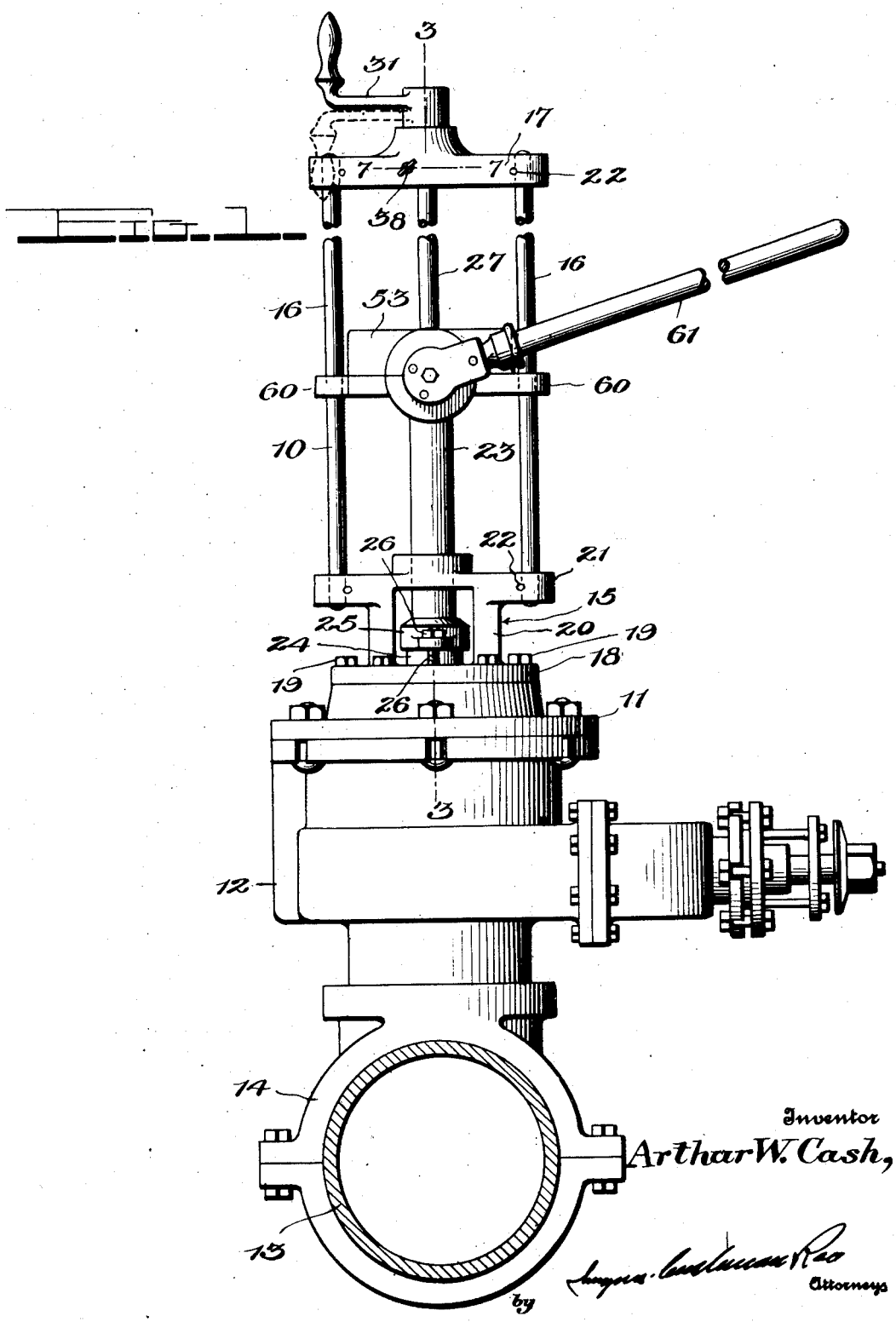

1,216,284.

Patented Feb. 20, 1917.
4 SHEETS—SHEET 2.

Inventor
Arthur W. Cash,
By
Attorney

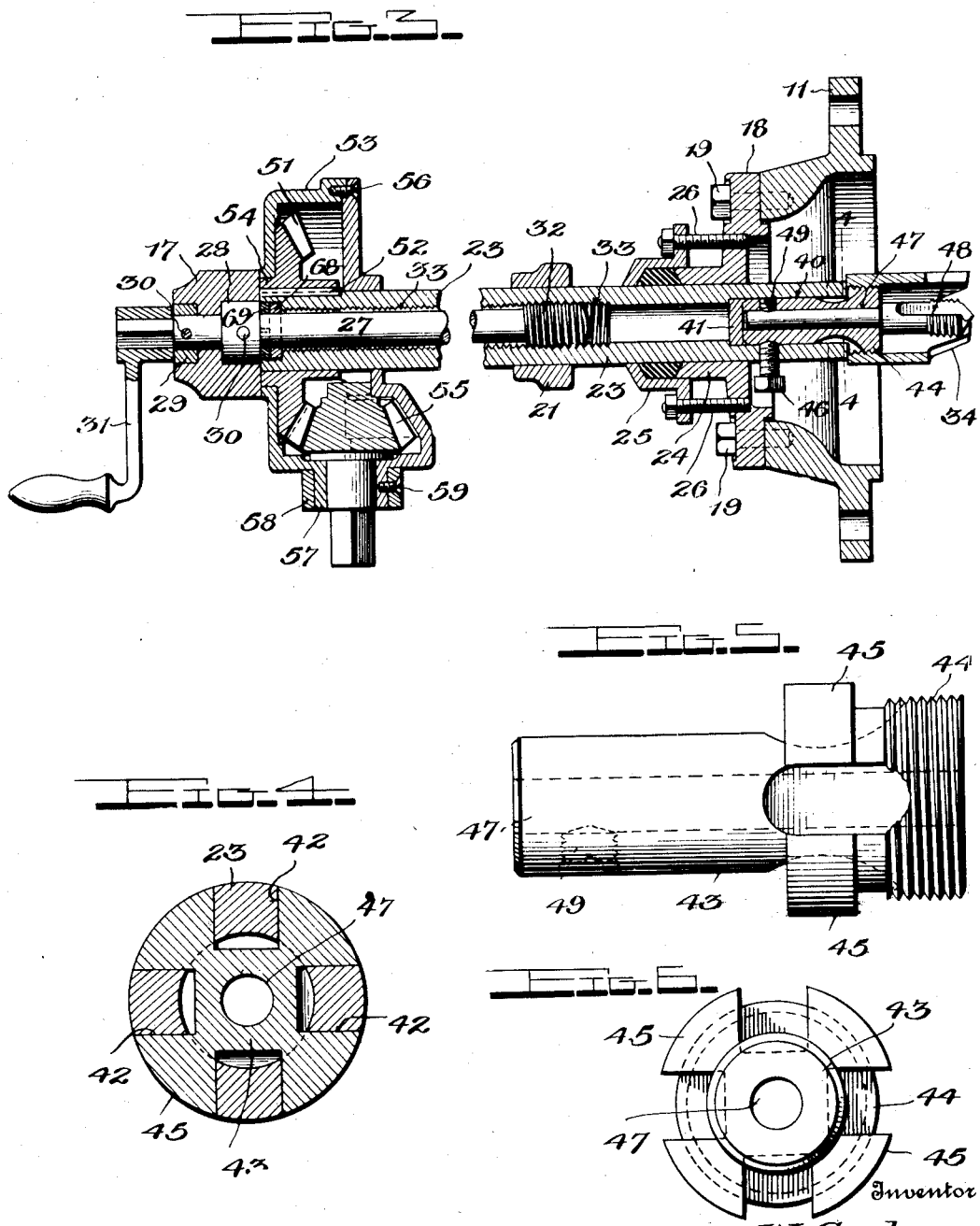

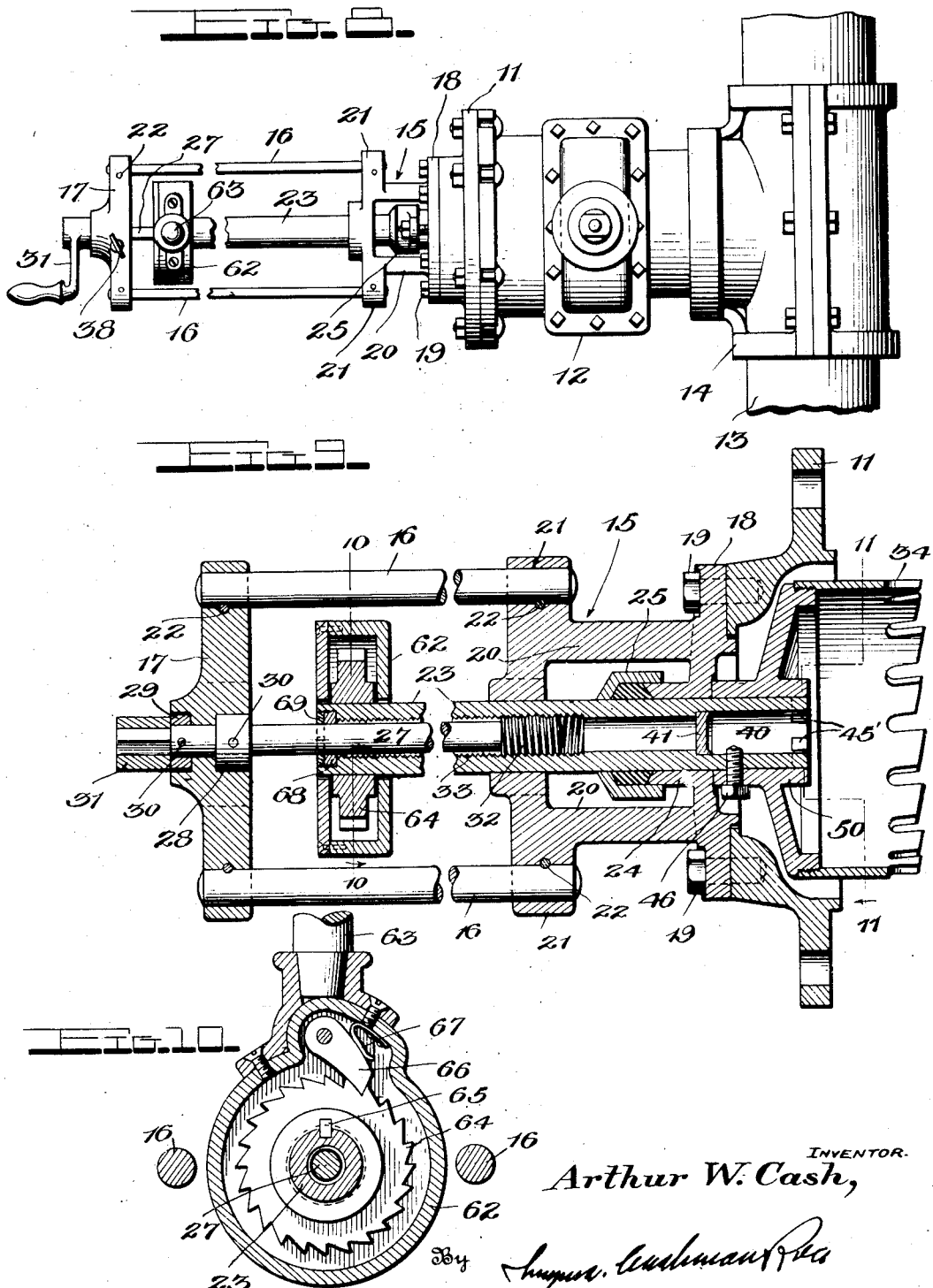

UNITED STATES PATENT OFFICE.

ARTHUR W. CASH, OF DECATUR, ILLINOIS, ASSIGNOR TO H. MUELLER MFG. CO., OF DECATUR, ILLINOIS, A CORPORATION OF ILLINOIS.

TAPPING-MACHINE.

1,216,284. Specification of Letters Patent. Patented Feb. 20, 1917.

Application filed June 23, 1915. Serial No. 35,815.

*To all whom it may concern:*

Be it known that I, ARTHUR W. CASH, a citizen of the United States, residing at Decatur, in the county of Macon and State of Illinois, have invented new and useful Improvements in Tapping-Machines, of which the following is a specification.

This invention has reference to improvements in tapping machines adapted for use in cutting into and making branch or other connections with pipes or mains.

An object of this invention is to provide means whereby the cutter may be advanced toward or withdrawn from the pipe or main to be cut either manually or automatically, and should the cutter be fed forwardly automatically, the rate of advance during the progress of the boring operation may be in proportion to the speed of rotation of the cutter and in proportion to the resistance with which the cutter meets. The means for automatically advancing or withdrawing the cutter contemplates an improved frictional feeding device which is capable of minute and ready adjustment; which allows the rate of advance to be varied proportionately to the rotary movement of the cutter to suit varying conditions under which the cutting may be carried on; and which prevents damage to the cutter when the cutter is brought into or is in engagement with the pipe or main to be cut.

A further object of this invention is to provide the machine with improved driving mechanism which is in compact form, capable of ready operation, and which is entirely inclosed. The driving mechanism is mounted upon the cutter shaft and is longitudinally movable therewith, and as the driving mechanism is of compact form it is adapted to be inclosed in a single small casing which is likewise mounted on and movable with the cutter shaft; this casing being so constructed as to form a receptacle for a lubricant for the driving gears.

Another object of the invention is to provide improved means for securing shell cutters of various sizes to the cutter shaft whereby the shell cutter is prevented from displacement relative to the shaft and the strains and stresses of the connection therebetween are greatly reduced.

A further object of this invention is to provide the machine with a frame, for carrying the operating means, which is relatively simple in construction and which is composed of a relatively small number of parts. My improved tapping machine is light in weight, cheap to manufacture and yet has sufficient rigidity and strength to resist the forces and strains to which it is subjected, and the various parts are all inclosed in a compact form, so that the working parts are protected from dust, dirt, grit and the like, which would tend to injure these parts should it gain access to them.

With these and other objects in view, the invention consists in the novel construction, and arrangement of parts hereinafter more fully described, reference being had to the accompanying drawings, in which,—

Figure 1 is an elevation of my improved tapping machine connected to a pipe or main.

Fig. 3 is a longitudinal section of my improved tapping machine taken on line 3—3 of Fig. 1.

Fig. 4 is a sectional view taken on line 4—4 of Fig. 3.

Fig. 5 is a side view of my improved cutter arbor.

Fig. 6 is an end view of the same.

Fig. 8 is a top plan view of my machine showing a modified form of driving mechanism.

Fig. 9 is a horizontal section through the tapping machine shown in Fig. 8.

Fig. 10 is a sectional view taken on line 10—10 of Fig. 9.

Figure 7:
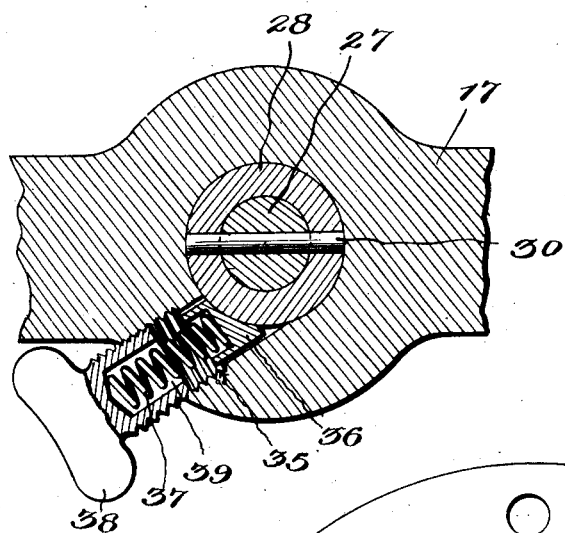
Fig. 7 is an enlarged detail view of the frictional feed mechanism for effecting the automatic feeding of the cutter.

Referring to the drawings, in which like parts are designated by similar characters of reference, 10 is my improved tapping machine, the same being shown secured by means of a suitable reducer or adapter 11 to a casing 12 which may be of any approved construction and which incloses a suitable valve (not shown) for shutting off the water after the hole has been formed in the main 13. The valve casing 12 is connected to the main by means of the usual sleeve 14.

The frame for carrying the operating parts comprises, substantially, a body 15, standards or side bars 16, and a feed-screw yoke 17. The body 15 has a circular bed plate 18 provided with tap holes to receive tap bolts 19 for securing the adapter 11 to the body, so that the tapping machine may be secured to different sizes of valve casings, the size depending on the diameter of the hole to be cut in the main. Extending perpendicularly from the bed plate 18 and integral therewith are posts 20 carrying at their forward ends a cross-yoke 21 which is provided at its opposite ends with openings to receive the standards or side-bars 16. The standards 16 serve as guides for the driving mechanism of the preferred form of my device, as hereinafter explained, and carry at their outer ends a feed-screw yoke 17. The standards 16 are securely held in place by the standard pins 22 to give the necessary rigidity to the machine. The body 15 is preferably formed of a single casting; and it will be noted that my frame is skeleton in form, consists of a minimum number of parts, and is light in weight, so that it may be readily carried from place to place and easily installed into working position. The cross-yoke 21 and the bed plate 18 are centrally bored to receive a hollow cutter shaft 23. The bed plate 18 is provided with a flange or neck 24 which serves as a bearing for the cutter shaft, and at the end of the neck 24 is a stuffing box comprising a gland cap 25 provided with a packing to make a fluid-tight connection and prevent escape of fluid from the valve casing. The gland cap 25 is provided with bolts or studs 26 extending into the bed-plate 18 for adjustably maintaining the gland cap in place.

The feed-screw yoke 17 is centrally bored to receive a feed-screw 27 which is reduced at its forward end for the reception of a thrust collar 28 on one side of the yoke 17 and a feed-screw collar 29 to the side of the yoke whereby the feed-screw is maintained against longitudinal movement. If desired, the thrust collar 28 may be a part of and integral with the feed-screw 27. The collars 28 and 29 are held in place by collar pins 30. The forward end of the feed-screw 27 is squared or polygonal in shape to receive a handle 31 by means of which the feed-screw is rotated. The inner end of the feed-screw is provided with an external male screw-thread 32 adapted to engage a complemental screw-thread 33 of the hollow cutter shaft 23, so that as the feed-screw is rotated by means of the handle 31, the cutter shaft 23 together with the shell-cutter 34, carried upon the inner end of the shaft, is advanced toward or withdrawn from the pipe to be cut, as desired. To prevent lateral movement between the forward end of the cutter shaft 23 and the feed-screw 27, and to hold the axes of these members in alinement, a split washer 68 is screw-threaded into the recessed end of the cutter shaft and a split ring 69 is used to hold the washer against displacement, but if desired the split ring 69, may be omitted. When it is desired to bring the shell cutter 34 into position against the pipe preparatory to the boring operation, or to withdraw the shell cutter from the valve casing, after the boring operation is completed, the handle 31 is manually operated. However, after the cutter is in position against the pipe and during the boring operation, it is desired that the feeding be done automatically, and that the rate of advance be gradual and proportionate to the speed of rotation of the cutter.

This means for automatically feeding the cutter shaft 23, with the shell cutter 34 thereon, forwardly toward the pipe to be cut and during the boring operation, consists in a frictional feed device which I will now describe and which is clearly shown in Fig. 7. The feed-screw yoke 17 has a bore 35 screw-threaded for a portion of its length and preferably the longitudinal axis of the bore is inclined angularly to a radius of the feed-screw and inwardly in the direction (as indicated by the arrow, Fig. 2) of rotation of the handle when the handle is revolved to feed the cutter 34 toward the pipe 13. Within the bore 35 is a friction feed plug 36 having its inner end curved concentrically to the periphery of the thrust collar 28 and adapted to bear thereagainst, and having its other end recessed to form a socket for a spring 37. A thumb-screw 38 having a socket or recess 39 to receive the other end of the spring 37 is inserted into the bore 35 and bears against the spring 37 to place the latter under compression and thereby yieldingly force the feed plug 36 against the thrust collar 28 which is fixed to the feed-screw 27. When the cutter shaft 23 is rotated, by means of the driving mechanism hereinafter described, to advance the cutter automatically, the feed plug 36 is forced against the collar 28 by advancing the thumb-screw 38 in the bore 35 and placing the spring 37 under greater compression, so that in a measure, the tendency of the feed-screw to rotate with the cutter-shaft, due to the threaded engagement therebetween, is repelled and the feed-screw is held stationary. The rate of advance of the rotating cutter shaft 23 is in proportion to the amount of friction placed on the feed-screw 27 by the friction plug 36 and to the pitch of the feed-screw. The less friction placed on the feed-screw the smaller will be the rate of advance of the shell cutter 34, for the feed-screw will rotate, (though at less speed), with the cutter-shaft, as it is in threaded engagement therewith. But when a greater amount of friction is placed on the feed-screw by means of the thumb-screw 38, the frictional force may be made greater than the frictional force between the screw-threaded portions of the feed-screw, and the cutter shaft, so that the feed-screw is held stationary or revolves at a much less speed than the cutter shaft, and the rate of advance of the cutter shaft is therefore greater. It will be noted that thus I provide a means capable of ready adjustment for varying the automatic feeding of the shell cutter. The bore 35 is disposed at the angle shown to a radius to allow the handle 31 to be rotated counter-clockwise to feed the cutter forward without meeting much resistance from the plug 36, but when the cutter is fed automatically forward the feed-screw tends to rotate in a clockwise manner and the plug 36 acts as a pawl and grips the thrust-collar 28 with greater force.

Referring now to the cutter shaft 23, it will be noted that the rear end of the same has an enlarged bore 40 to receive a spindle plug 41 which is expanded into the bore and which prevents the escape of fluid through the hollow cutter-shaft 23, and which serves to receive the thrust of a center drill or an arbor. The extremity or inner end of the cutter shaft 23 is provided with notches 42 for the reception of lugs on the member to which the shell cutter 34 is attached.

Various sizes of shell cutters may be used, but for the purpose of securing or connecting shell cutters of small sizes to the cutter shaft 23, I provide an improved arbor (Figs. 3 to 6, inclusive) comprising a bar 43 having a screw-threaded end 44 which receives a complemental screw-thread on the interior circumference of the shell cutter 34. The arbor, immediately above the screw-threaded portion, is provided with a plurality of outwardly extending arcuate lugs 45, in the present instance four being shown, the lugs being diametrically opposed, and being adapted to be received in the correspondingly formed notches 42 in the extremity of the cutter shaft 23. The lugs of the arbor registering in the notches of the cutter shaft prevent relative rotation between the same, securely maintain the arbor in position and distribute the strains between the arbor and the shaft. To prevent a longitudinal displacement of the arbor, a set-screw 46 is provided which extends through an aperture in the cutter shaft and abuts at its inner end against the arbor. The arbor has a central bore 47 to receive a tap or pilot-drill 48 when it is desired to use the same. The drill may be secured in place by a set-screw 49.

Figure 11:
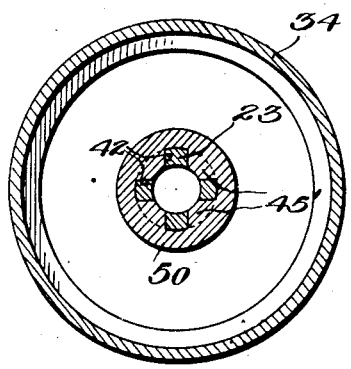
Fig. 11 is a sectional view taken on line 11—11 of Fig. 9.

When it is desired to use a shell cutter of larger diameter, the arbor 43 is removed and a cutter hub 50, as shown in Figs. 9 and 11, may be secured to the cutter shaft 23. The hub 50 is provided with lugs 45′ which correspond in shape and position to the lugs 45 of my improved arbor except that the lugs 45′ are internal. The lugs 45′ engage in the notches 42, and the hub 50 is secured in place by means of a set-screw 46.

The mechanism and parts heretofore described are common to the two embodiments of my invention which I have shown in the drawings. Both of the embodiments shown are similar in all particulars except in the driving mechanisms which I will now explain.

Figure 2:
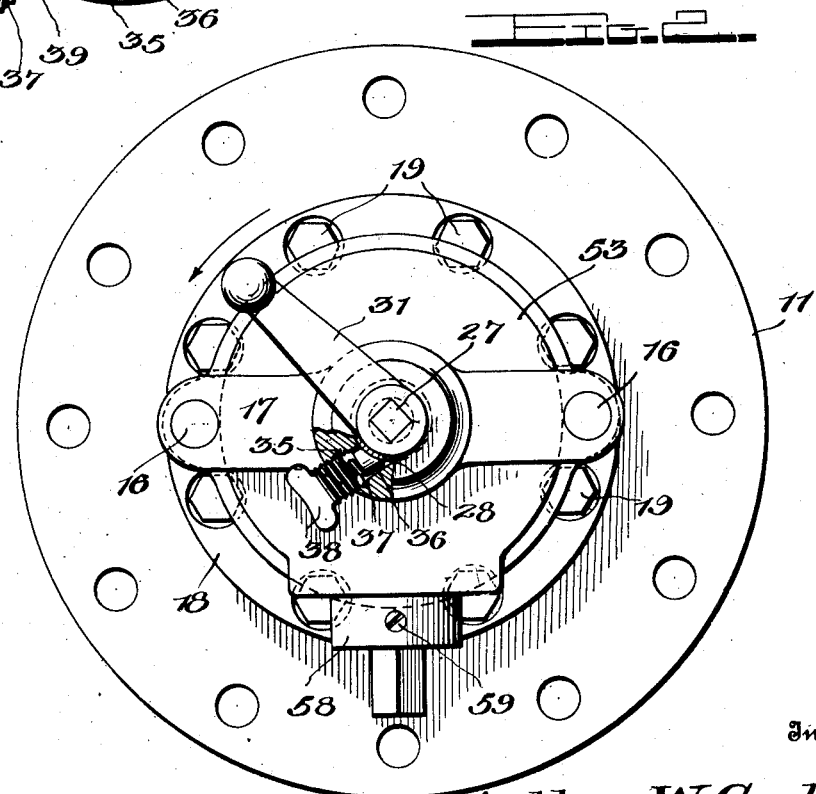
Fig. 2 is a forward end view of the same, part broken away to show the automatic or frictional feed mechanism.

Referring to Figs. 1, 2 and 3, wherein is disclosed the preferred form of driving mechanism, 51 is a bevel gear keyed to the cutter shaft 23 by means of the bevel gear key 52, so that the shaft 23 will rotate with the gear. About said bevel gear 51 is mounted a casing or frame 53 centrally bored to receive the cutter shaft 23 and the shank 54 of the gear 51. At one side of the casing is an opening adapted to receive the shaft and shank of the bevel gear 55 which meshes with gear 51 and the axis of which is disposed at right angles to the gear 51. The casing 53 is split vertically in a plane parallel to the axis of the shaft of the driving gear 55 and the two parts of the casing are held together by means of screws 56, and where the shaft of the driving gear 55 extends through the casing, the latter is provided with a neck 57 which forms a bearing for the shaft of the gear 55 and which is reinforced by a binding ring 58 secured in place by a set-screw 59. The casing 53 is adapted to form a receptacle for oil or grease whereby the gears are lubricated at all times.

The casing 53 is provided with apertured eyes or ears 60 through which pass the standards 16 and by this means the driving mechanism is guided as it is carried to and from the pipe. The shaft of the driving gear 55 is squared or polygonal in shape to receive a ratchet handle 61, so that as the ratchet is operated, the driving gear is rotated, and this motion is imparted to the cutter shaft and cutter by means of the bevel gear 51.

Referring to the driving mechanism shown in Figs. 8, 9 and 10, 62 is a casing loosely mounted upon the outer end of the cutter shaft 23. Within the casing 62 is a ratchet wheel 64 fixed to the cutter shaft 23 by means of a key 65. 66 is a pivoted pawl, the free end of which is maintained in contact with the teeth of the ratchet wheel 64 by means of a spring 67. When it is desired to rotate the shell cutter 34 the handle 63 carried by the casing 62, is given an oscillating or vibratory movement to alternately cause the pawl to slide over the teeth of the wheel 64 and to engage the end of the pawl with the teeth.

It is often desirable in place of frictionally feeding the cutter forwardly upon the operation of the driving means to feed the same positively and for this purpose I so construct the handle 31 that it may be reversed as shown by dotted lines in Fig. 1. When the handle is reversed the yoke 17 is in the path of the handle so that when the cutter shaft 23 is rotated by either of the driving mechanisms shown and described, the knob of the handle 31 strikes the yoke 17 and the feed-screw is thereby held against rotation and the cutter shaft is caused to move longitudinally.

When it is desired to place my tapping machine into position for cutting, a shell-cutter of the desired size is selected, and should the cutter be small, my improved arbor 43 is secured to the inner extremity of the cutter shaft 23 with the lugs 45 of the arbor engaging in the notches 42 of the shaft. However, should the hole to be cut be of large size, the hub 50 is secured to the end of the cutter shaft 23 with the lugs 45' engaging in the notches 42. The valve casing 12 is then secured to the main by means of the sleeve 14. The tapping machine is now secured to the valve casing 12 by means of the adapter 11, machine bolts, or any other suitable securing means being employed for this purpose. The crank handle 31, being in the position shown in full lines in Fig. 1, is rotated, thereby rotating the feed-screw 27, so that the cutter shaft 23 together with the cutter 34 is fed forwardly until the latter comes into contact with the outer surface of the main and during this operation the driving mechanism for rotating the cutter shaft 23 is not rotated. To cause the shell cutter to be fed forwardly after the teeth of the same are brought into contact with the outer surface of the main to be cut, the thumb-screw 38 is advanced, so that the feed-plug 36 bears with the desired amount of force against the thrust collar 28. If the preferred form of my driving mechanism is used, the driving gear 55 is now rotated by means of the ratchet handle 61, and a rotary movement is imparted to the cutter-shaft 23, and the cutter 34 by means of the fixed bevel gear 51. As the feed-screw 27 is in threaded engagement with the cutter shaft 23, upon rotation of the latter, the feed-screw, due to the frictional engagement therebetween tends to rotate with the cutter shaft, and should the frictional feed-plug 36 be totally withdrawn from engagement with the thrust-collar 28, the feed-screw would tend to rotate substantially at the same speed as the cutter shaft, so that the latter would not be advanced toward the pipe. However, upon forcing the feed-plug 36 against the thrust-collar 28, the rotary movement of the feed-screw is partially prevented, so that it would rotate at less speed, or remain stationary, depending upon the force with which the plug 36 bears against the collar 28 and therefore the cutter-shaft 23 would be advanced forwardly and force the cutter, during the boring operation, into the main when the resistance of the material being cut overcomes the pressure of the plug 36 against the thrust collar 28, the feed-screw 27 tends to rotate at a speed approaching that of the cutter shaft 23, and, therefore, the cutter 34 is advanced less rapidly, and damage to the teeth of the latter is prevented.

If it is desired, the cutter shaft 23 may be fed forwardly by reversing the handle 31 so that the knob of the latter abuts the yoke 17, and when the cutter shaft is rotated the feed screw is held against rotation and the cutter is driven into the main to be cut. It will thus be noted that the cutter may be fed automatically forwardly either by means of my improved frictional feeding means or by means of reversing the handle 31.

It is, of course, evident that my invention is susceptible of various modifications and changes which would be within the spirit of my invention without departing from the scope of the following claims.

What I claim as new is,—

1. In a tapping machine, the combination with a frame, a cutter-shaft, and means associated with the shaft for causing the longitudinal movement of the same, of driving means for rotating said shaft and movable therewith, said driving means comprising a gear fixed to the shaft, a driving gear meshing with said fixed gear, and a casing inclosing said gears movable with said shaft and guided in its movement by said frame.

2. In a tapping machine, the combination with a cutter-shaft, a frame having side-bars or standards, and a feed-screw associated with said cutter-shaft for causing the longitudinal movement of the same, of driving means upon said cutter-shaft and movable therewith, and a casing about said driving means having apertured eyes through which said side-bars or standards pass whereby said casing is guided.

3. In a tapping machine, the combination with a frame, a cutter-shaft having upon its end a cutter, and means associated with the cutter-shaft for advancing or withdrawing the cutter to and from the main, of driving means carried by said shaft and movable therewith, said driving means comprising a gear fixed to the shaft and a driving gear meshing with said fixed gear, a handle for rotating said driving gear, and a casing for inclosing said gears, said casing being adapted to form a receptacle for a suitable lubricant for said driving means.

4. In a tapping machine, a frame comprising a feed-screw yoke, a cast-iron body, and a pair of standards connecting said yoke and said body, a cutter shaft passing through said cast-iron body and having a cutter upon its end, a feed-screw passing through said feed-screw yoke and having its inner end in threaded engagement with the outer end of said cutter shaft, driving means secured upon the outer end of said cutter-shaft, and a casing inclosing said driving means and embracing said sidebars.

5. In a tapping machine, a frame, a hollow cutter-shaft having notches in its inner end, means for rotating said cutter-shaft, means for causing the longitudinal movement of said cutter-shaft, and an arbor having a central bore for the reception of a pilot drill and having a screw-threaded portion adapted to engage the complemental screw-threaded portion of a cutter, said arbor also having lugs corresponding in shape to the notches in the inner ends of said cutter-shaft and adapted to engage therein.

6. In combination, a shaft, a feed member associated with said shaft and friction means disposed at an angle to a line passing through the axis of rotation of said feed member and adapted to bear against said feed member to retard the movement thereof relative to said shaft.

7. In combination, a shaft, a feed member associated with said shaft, a stationary member engaging said feed member and having a bore extending at an angle to the radius of said feed member, and adjustable means disposed in said bore and frictionally engaging said feed member to retard the movement of the same relative to said shaft.

8. In combination, a rotary member, a rotary feed member associated therewith, a stationary supporting member for said feed member, a bore in said supporting member extending at an angle to the radius of said feed member, a plug in said bore adapted to bear against said feed member and means in the bore for forcing said plug yieldingly against said feed member to retard the rotary movement of the feed member imparted to it by the rotary movement of said shaft.

9. In a tapping machine, a frame having a yoke provided with a central bore and a side bore extending at an angle to the radius of said central bore, a cutter-shaft, a cutter on said shaft, a feed-screw in the central bore of said yoke and in threaded engagement with said cutter shaft, means for manually rotating said feed-screw to move the cutter-shaft longitudinally, means for rotating said cutter-shaft, a friction-plug in said bore adapted to bear against said feed-screw, and means in the bore for forcing said friction-plug yieldingly against said feed-screw whereby the rotary movement of the feed-screw imparted to it by the rotary movement of the cutter shaft is retarded.

10. In a tapping machine, the combination with a cutter-shaft, and means for causing the longitudinal movement of said shaft, of driving means for rotating the shaft and mounted thereon so as to be longitudinally movable therewith, a frame having sidebars, and a casing inclosing said driving means, longitudinally movable with said shaft and slidably engaging said standards whereby the casing is guided.

11. In a tapping machine, a frame, a cutter shaft, a feed-screw associated with said cutter shaft for causing the longitudinal movement of the same, driving means upon the cutter shaft for rotating the same, a detachable handle on said feed-screw for rotating said feed-screw to move the cutter shaft longitudinally, said handle being adapted to be reversed for engagement with the frame to hold the feed-screw stationary and cause the longitudinal movement of the cutter shaft when the latter is rotated.

In testimony whereof I have hereunto set my hand in presence of two subscribing witnesses.

ARTHUR W. CASH.

Witnesses:
 MABEL MCINTYRE,
 CHARLES G. AUER.